United States Patent [19]

Asanuma et al.

[11] 4,269,937

[45] May 26, 1981

[54] PHOTOGRAPHIC POLYOLEFIN COATED PAPER BASES WITH IONOMER LAYER

[75] Inventors: Yoshimasa Asanuma; Taiichi Nishimura, both of Fujinomiya, Japan

[73] Assignee: Fuji Photo Film Co., Ltd., Minami-ashigara, Japan

[21] Appl. No.: 52,047

[22] Filed: Jun. 25, 1979

[30] Foreign Application Priority Data

Jun. 23, 1978 [JP] Japan ................................. 53-76161

[51] Int. Cl.³ ............................................. G03C 1/86
[52] U.S. Cl. .................................... 430/538; 430/531; 430/536; 428/511; 428/515
[58] Field of Search ...................... 430/531, 536, 538; 428/511, 515

[56] References Cited

U.S. PATENT DOCUMENTS

| | | | |
|---|---|---|---|
| 4,061,833 | 12/1977 | Pelletier et al. | 428/511 |
| 4,069,188 | 1/1978 | Canard et al. | 428/511 |

FOREIGN PATENT DOCUMENTS 49-15423  2/1974  Japan.

OTHER PUBLICATIONS

Ward, 1974–1975 Modern Plastic Encyclopedia pp. 40–41 (1975).

*Primary Examiner*—Jack P. Brammer
*Attorney, Agent, or Firm*—Sughrue, Rothwell, Mion, Zinn and Macpeak

[57] ABSTRACT

In a base for a photographic sensitive material comprising a polyolefin coated paper, the improvement which comprises a layer of an ionomer of an α-olefin and an α,β-ethylenically unsaturated carboxylic acid between the surface of the paper and the polyolefin coating.

11 Claims, No Drawings

PHOTOGRAPHIC POLYOLEFIN COATED PAPER BASES WITH IONOMER LAYER

BACKGROUND OF THE INVENTION

1. Field of the Invention

The present invention relates to bases for photographic sensitive materials comprising polyolefin coated paper.

2. Description of the Prior Art

Since polyolefin synthetic resins such as polyethylene, polypropylene, etc., have an excellent waterproofing property and an excellent moisture-proofing property, papers have been coated with these polyolefins in many fields in order to waterproof them. In photographic sensitive materials so-called waterproof printing paper prepared by applying photographic emulsion layers to a paper base the surfaces of which are coated with polyolefin has been used to shorten the development time. By the use of the above-described waterproof printing paper, the time required for development processing is ½ to ⅓ that required using baryta paper as the base, because the time required for carrying out washing and drying after development processing can be remarkably reduced.

An extrusion coating process has generally been adopted in producing bases for waterproof printing paper as a process for applying polyolefin to paper. Namely, melted polyolefin is flown as a film onto a surface of the paper while moving the paper, and the polyolefin and the paper are then allowed to adhere to one another by adaptation. However, since the polyolefin is a non-polar high molecular material, its adhesion to paper is not always good, and coating papers in which the adhesion of the polyolefin to the paper is insufficient are sometimes obtained depending upon the raw materials used or the manufacturing method. It has been known that, in the case of using such coating paper as a base for printing paper, the following problems occur in practice.

Namely, when a paper in which the adhesion of the polyolefin to the paper is insufficient is used as the base for a waterproof printing paper, the polyolefin separates from the paper at the edges (cut ends) of the printing paper due to friction, etc., and ruins the appearance of the printing paper. Also, particularly, when separation at the edges occurs in a wet state during a development processing, the processing solution is absorbed by the paper and, consequently, rapid processing often cannot be carried out.

Further, when the waterproof printing paper after conclusion of the development processing is cut to a desired size by a special knife, if the adhesion of the polyolefin to the paper is insufficient, whisker-like stretched parts of polyolefin are often formed at the cut ends causing a poor appearance of the cut ends. In some cases, the stretched polyolefin is not cut completely and two or more of cut printing papers link in a row. Therefore, when using the polyolefin coated paper as a base for printing paper, sufficient adhesion of the polyolefin to the paper is a very important requirement.

The simplest process for improving adhesion of polyolefin to paper comprises carrying out extrusion coating at a resin temperature of 320° C. or more which is just below the decomposition temperature of the polyolefin. However, a part of the polyolefin decomposes even at this temperature to result in not only deterioration of operation efficiency but also deterioration of tone, strength, and other properties of the resulting coated paper and, the thermal decomposition products have a bad influence upon the photographic emulsions which is fatal for photographic paper bases.

Generally, since photographic paper has a smooth surface, which is different from kraft paper, a remarkable improvement in adhesive strength cannot be obtained even if the above-described process is utilized or activation processing of the surface of paper such as by corona discharge, etc., is carried out. As an effective process for improving the adhesion of a polyolefin to paper, a material which exhibits good adhesive property for both the paper and the polyolefin has been applied to a surface of the paper before application of polyolefin (a so-called primer treatment) by extrusion coating. However, polyethyleneimine and low molecular polyethylene emulsions which are known effective primers all have a bad influence on the photographic emulsions, and, therefore, they are unsuitable as raw materials for photography. Thus it is difficult to use the primer treatment in producing bases for waterproof printing paper.

As primers for extrusion coating photographic paper with a polyolefin, there are copolymers comprising ethylene and salts of acrylic acid (or methacrylic acid) as constituents as described in Japanese Patent Application (OPI) No. 15423/74 (The term "OPI" as used herein refers to a "published unexamined Japanese patent application"). However, in the case of using these primers, sufficient adhesive strength can not be obtained if the extrusion temperature of the polyolefin is reduced or the thickness of the polyolefin is reduced, and the requirements of improving production aptitude at low extrusion temperatures or of reducing material cost, etc., cannot be satisfied. Accordingly, primers are needed which satisfy these requirements and produce high adhesion.

In consideration of the above-described facts, studies directed to primers which exhibit an excellent improvement in adhesion of the polyolefin to photographic paper and do not have a bad influence upon photographic emulsions. As a result, bases for waterproof printing paper having an excellent adhesive property for polyolefins have been found and constitute the present invention.

SUMMARY OF THE INVENTION

Accordingly, it is a principal object of the present invention to provide a polyolefin coated photographic paper having improved adhesion between the polyolefin layer and the surface of the paper.

It is another object of the present invention to provide a polyolefin coated photographic paper having improved adhesion between the polyolefin and the paper such that when the paper is cut to a desired size, neatly cut edges are formed.

It is still another object of the present invention to provide a polyolefin coated photographic paper having improved adhesion between the polyolefin and the surface of the paper such that the paper does not absorb development processing solutions and development can be conducted quickly.

It is a further object of the present invention to provide a means for improving adhesion between a polyolefin and a paper surface which does not require high polyolefin extrusion temperatures.

It is still a further object of the present invention to provide a means for improving adhesion between a coated polyolefin and a paper surface which does not have an adverse influence on the properties of photographic emulsions.

Accordingly, the present invention provides a base for a photographic sensitive material comprising polyolefin coated paper, which is characterized by a layer of a so-called ionomer which is a copolymer of an α-olefin and α,β-ethylenically unsaturated carboxylic acid cross-linked by ionic cross-linkages with 1 to 3 valent metals of the Groups I, II, III, IV-A and VIII in the Periodic Table utilizing the carboxyl groups in the molecule chains.

DETAILED DESCRIPTION OF THE INVENTION

The term "α-olefin" as used in the present invention means a substance represented by the formula $RCH=CH_2$ where R represents a hydrogen atom or a hydrocarbon group having 1 to 8 carbon atoms. Examples include ethylene, propylene, butene-1, styrene, pentene-1, hexene-1, heptene-1, 3-methyl-butene-1 and 4-methylbutene-1, etc. Among them, ethylene is particularly preferred from the viewpoint of adhesive strength. A suitable amount of α-olefin in the copolymer ranges about 60 to 99.8 mol%, preferably 75 to 99.5 mol%, most preferably 80 to 99.2 mol%.

Further, the carbon atom number of the α,β-ethylenically unsaturated carboxylic acid used in the present invention is 3 to 10, preferably 3 to 6 and most preferably 3 to 4. It is preferred that the number of carboxyl groups in the α,β-ethylenically unsaturated carboxylic acid is 1 or 2.

Examples of the α,β-ethylenically unsaturated carboxylic acid include acrylic acid, methacrylic acid, α-ethylacrylic acid, itaconic acid, maleic acid, fumaric acid, monoesters of dicarboxylic acids such as monoethyl fumarate, maleic acid anhydride and other α,β-ethylenically unsaturated carboxylic acid anhydrides. Among them, acrylic acid, methacrylic acid, α-ethylacrylic acid and itaconic acid are preferred from the viewpoint of adhesive strength, and, particularly, acrylic acid and methacrylic acid are preferred.

The content of the α,β-ethylenically unsaturated carboxylic acid in the copolymer is in the range of about 0.2 to 40 mol%, preferably about 0.5 to 25 mol% and most preferably about 0.8 to 20 mol%. If it is less than 0.2 mol%, the adhesive property is insufficient. On the other hand, if it is higher than 40 mol%, the adhesive strength to the polyolefin deteriorates, because a character of the α-olefin component is lost or the flow property in a fused state is such that difficulty in extrusion processing results.

Further, as metals used in the present invention, it is possible to use 1 to 3 valent metals of Groups I, II, III, IV-A and VIII in the Periodic Table. Examples of them include $Na^+$, $K^+$, $Ca^{++}$, $Mg^{++}$, $Zn^{++}$, $Ba^{++}$, $Fe^{++}$, $Co^{++}$, $Ni^{++}$, $Fe^{+++}$ and $Al^{+++}$. Among them, $Na^+$, $K^+$, $Mg^{++}$, $Ca^{++}$ and $Zn^{++}$ are particularly preferred. Further preferred examples include $Na^+$ and $K^+$. The degree of neutralization of the carboxyl groups by the metal ions is in the range of about 5 to 97%, preferably about 10 to 95% and most preferably about 20 to 90%. If the degree of neutralization is less than 5% or higher than 95%, sufficient adhesive strength cannot be obtained.

It is not necessary that the primer according to the present invention be composed of only two components consisting of α-olefin and α,β-ethylenically unsaturated carboxylic acid. Namely, two or more α-olefins may be used in order to give the properties of other hydrocarbons to the copolymer, and two or more kinds of α,β-ethylenically unsaturated carboxylic acid may be used. Further, any third copolymerizable monomers may be used as a combination of α-olefin and α,β-ethylenically unsaturated carboxylic acid. Preferred monomers include vinyl esters, acrylates having up to 8 carbon atoms such as methyl acrylate or ethyl acrylate, and methacrylates such as methyl methacrylate or ethyl methacrylate, etc. Generally these third monomers are not used in amounts exceeding 35 mol% since the adhesive strength between the paper and the polyolefin decreases.

Examples of the copolymers as the primer according to the present invention include ethylene-acrylic acid copolymer, ethylene-methacrylic acid copolymer, ethylene-itaconic acid copolymer, ethylene-monomethyl maleate copolymer, ethylene-maleic acid copolymer, ethylene-acrylic acid-methyl methacrylate copolymer, ethylene-methacrylic acid-methyl methacrylate copolymer, ethylene-itaconic acid-methyl methacrylate copolymer, ethylene-monomethyl maleate-ethyl acrylate copolymer, ethylene-acrylic acid-vinyl alcohol copolymer, ethylene-propylene-acrylic acid copolymer, ethylene-styrene-acrylic acid copolymer, ethylene-methacrylic acid-isobutyl acrylate copolymer, ethylene-methacrylic acid-acrylonitrile copolymer, propylene-acrylic acid copolymer, ethylene-fumaric acid-vinyl methyl ether copolymer, ethylene-vinyl chloride-acrylic acid copolymer, ethylene-vinylidene chloride-acrylic acid copolymer, ethylene-methacrylic acid-acrylic acid copolymer, ethylene-butene-1-acrylic acid copolymer, ethylene-itaconic acid-acrylonitrile copolymer, ethylene-α-ethylacrylic acid copolymer and ethylene-monomethyl maleate-vinyl alcohol copolymer, etc. The most preferred examples of them include ethylene-acrylic acid copolymer, ethylene-methacrylic acid copolymer and ethylene-itaconic acid copolymer.

The ionomers used in the present invention generally have a melt index of about 0.1 to 100 g/10 min.

In order to improve adhesion of the polyolefin to the paper, it is preferred that the primer is present on the surface of the paper. Accordingly, it is preferred to apply the primer to the surface of the paper at the last stage of the paper making process or just before extrusion coating. In more detail, it is preferred to use a process which comprises carrying out surface sizing with a solution of the primer by size-press in the paper making process or a process which comprises applying a solution of the primer to the surface of the paper by the common roll-coat or over-coat method at the last step of paper making or just before extrusion coating.

Further, as another process for applying the primer to the surface of the paper there is the so-called simultaneous extrusion coating process, which comprises extruding the primer together with polyethylene to coat the surface of the paper with the primer and the polyethylene at the same time assuming the primer is a solid resin capable of being extrusion processed. The simultaneous extrusion coating process has the advantage that the number of steps is reduced as compared with processes for applying the solution of the primer by a size-press, roll-coat or back-coat process, etc., because the primer and the polyethylene are applied at the same time by extrusion coating.

The ionomer as the primer according to the present invention is fed as an emulsion or is fed in a solid resinous state capable of extrusion processing. Therefore, as a process for applying the ionomer to the surface of the paper, not only the size-press, roll-coat and back-coat processes but also the simultaneous extrusion coating process may be adopted. Further, in the case of using the emulsion, a watermiscible solvent such as ethanol may be admixed as a part of the solvent to improve application.

A suitable coating amount of the ionomer used in the present invention is about 0.001 g/m$^2$ or more, preferably about 0.01 g/m$^2$ or more, and more preferably about 0.1 g/m$^2$ or more (dry base). When the coating amount of the ionomer is less than 0.001 g/m$^2$ (dry base), sufficient adhesive strength cannot be obtained and, therefore, the object of the present invention is not achieved. In general, since the tensile strengths of the polyolefin film and the ionomer film are greater than the tensile strength of paper, when a laminate obtained by adhering paper and polyolefin through the ionomer is peeled, peeling always occurs in the paper. Thus, even when the coating amount of the ionomer is large, cohesive failure does not occur in the ionomer layer and the upper limit of the coating amount of the ionomer is not critical and is primarily set for economic reasons.

According to the present invention, the following advantages are obtained.

Since the waterproof printing paper using the primer according to the present invention firmly adheres the polyolefin to the photographic paper, there are advantages that (1) the appearance of the printing paper is good, because the polyolefin is not separated from the paper at the edges (cut ends) by friction, etc., (2) rapid processing can be carried out because the paper does not absorb the development processing solution, and (3) the appearance of the cut ends is good because whiskerlike stretched parts of polyolefin are not formed on the cut ends when the waterproof printing paper is cut by a knife.

It is possible using the primer according to the present invention to reduce the extrusion temperature of the polyolefin to below 320° C. which is just below the decomposition temperature of the polyolefin. Accordingly, there are advantages that (1) tone, strength and properties of the resulting polyolefin coated paper are not damaged, (2) the bad influence of thermal decomposition products upon photographic emulsions can be prevented, (3) consumption of electric power is low and (4) operation efficiency increases.

Since the thickness of the coated polyolefin can be reduced, the raw materials can be economized. Furthermore, the primer according to the present invention does not adversely influence photographic emulsions.

Since the primer according to the present invention is a one-liquid type agent, handling thereof is simple and it is not necessary to consider the pot life of the solution, which is not the case for two-liquid hardening type primers.

Since the primer according to the present invention has good stability to heat and light (chiefly, ultraviolet rays), decomposition or discoloration do not occur, even if stored for a long period of time under exposure to heat or light. Accordingly, with the waterproof printing paper using the primer according to the present invention adhesive strength does not deteriorate or discoloration occur, even if the paper is stored for a long period of time under exposure to heat or light.

Since the primer according to the present invention is fed as a resinous solid state capable of being extrusion processed, simultaneous extrusion coating of the primer and the polyethylene can be carried out. Accordingly, a separate step of applying the primer can be omitted.

In the following, the present invention is illustrated in detail with reference to the following examples. The examination of adhesive strength between the polyolefin and the paper in the examples was carried out according to the method prescribed in American Society for Testing Materials (ASTM) D-903. That is, a sample strip produced by cutting the polyolefin coating paper in 2.5 cm widths is pulled at 15 cm/minute pulling rate in a direction of 180° to the sample strip, and the friction pull resistance is measured.

Further, examination of photographic emulsion fog is carried out as follows. Unexposed printing paper is developed by common development processing and reflectance is measured by applying white light to the surface of the emulsion layer. The relative reflectance is defined as follows. Relative reflectance=Reflectance of the surface of the emulsion layer in case of carrying out the common development processing of unexposed printing paper ÷ Reflectance of the standard white plate of magnesium oxide. According to this examination, a larger value for relative reflectance indicates less emulsion fog.

EXAMPLE 1

To the surface of a photographic paper having 150 g/m$^2$ weight, solutions of primers having the following compositions I and II were applied respectively and heated in a hot stream at 45° C. for 1 minute to dry. Composition I is a primer composition according to the present invention, and Composition II is a composition for comparison.

| Composition I | |
|---|---|
| Emulsion of ionomer having a 40% solid content (ethylene: 95 mol%, acrylic acid: 5 mol%, degree of neutralization: 85%, metal: Na$^+$) | 10 g |
| Water | 90 ml |
| Composition II | |
| Ethylene-sodium acrylate copolymer (molar ratio: 85:15, molecular weight: 250,000) | 5 g |
| Water | 100 ml |

Composition II is described in Japanese Patent Application (OPI) No. 15423/74 as a primer for extrusion coating of polyolefin on paper for photography. The amount of the primer (copolymer) applied was 0.2 g/m$^2$ dry in both cases. The primer processed surface of the paper was coated with polyethylene having a density of 0.916 g/cc by extrusion coating so as to have a 30 μm thickness.

On the other hand, the surface of paper in which the primer processing was not carried out was coated by extrusion processing under the same conditions. The temperature of fused polyethylene at coating was 285° C. in each case.

The adhesive strength between the paper and the polyethylene in the resulting polyethylene coated paper was 750 g/25 mm width in the case of carrying out the primer processing using Composition I according to the present invention and 400 g/25 mm width in the case of carrying out the primer processing using Composition II, and 53 g/mm width in the case of not carrying out the primer processing. Thus, it was confirmed that the effect of the primer according to the present invention on the adhesion of polyethylene to paper was remarkably excellent as compared with not only that of the case of not carrying out the primer processing but also that described in Japanese Patent Application (OPI) No. 15423/74.

EXAMPLE 2

In making a photographic paper having 180 g/m$^2$ of the weight, surface sizing was carried out using a primer solution having the following composition.

| Composition III | |
|---|---|
| Emulsion of ionomer having 50% of the solid content (ethylene: 90 mol%, methacrylic acid: 10 mol%, degree of neutralization: 90%, metal: K$^+$) | 10 g |
| Water | 100 ml |

On both surfaces of the resulting surface-sized paper, extrusion coating with polyethylene having a density of 0.926 g/cc was carried out such that each coating was 30 μm thick to produce a waterproof printing paper. The temperature of fused polyethylene was 290° C. On the other hand, as a comparison example, on both surfaces of paper for photography having 180 g/m$^2$ weight in which the surface sizing was not carried out, extrusion coating with the same polyethylene was carried out at 340° C. such that each coating was 30 μm thick.

The adhesive strength between paper and polyethylene in the two waterproof printing papers was 900 g/25 mm width in case of using the surface-sized paper using the primer and 350 g/25 mm width in case of using common paper for photography in which the primer processing was not carried out. Further, waterproof printing papers were produced by applying a silver halide photographic emulsion after processed the surface of each base by corona discharging at 25 watts/cm width of the output and 10 m/minutes of the processing rate. When fog of the emulsion layer was measured, the relative reflectance of the emulsion surface was 0.903 in case of using the paper in which the primer processing was carried out, while the relative reflectance was 0.850 in case that adhesive strength between the paper and the polyethylene was increased by elevating the extrusion temperature of polyethylene without carrying out the primer processing. Namely, the process which comprises extruding polyethylene at a high temperature to improve the adhesive strength between paper and polyethylene was not stable as a process for producing bases for photography due to increased fog of the emulsion layer.

EXAMPLE 3

To both surfaces of thick paper for photography having 150 g/m$^2$ of the weight, a solution of primer having the following Composition IV was applied. Further, as a comparison example, to both surfaces of thick paper for photography having 150 g/m$^2$ of the weight, a solution of primer having the Composition V was applied. Both surfaces of each of them was coated with polypropylene under the same extrusion condition so as to have 40 μm of the thickness. The rate of extrusion coating was 10 m/minute and the extrusion temperature was 310° C. The surface of the resulting polypropylene coating paper was subjected to corona discharging by the same manner as in Example 2, and an emulsion for printing paper was applied to produce waterproof printing papers.

| Composition IV | |
|---|---|
| 25% Emulsion of ionomer (ethylene: 80 mol%, itaconic acid: 20 mol%, degree of neutralization: 65%, metal: Mg$^{++}$) | 10 g |
| Water | 90 ml |
| Composition V | |
| Polyethyleneimine | 5 g |
| Water | 100 ml |

The adhesive strength between paper and polypropylene in each printing paper was 370 g/25 mm width in case of using the primer having the Composition IV and 360 g/25 mm width in case of using the primer having the Composition V, which was nearly the same. However, in the waterproof printing paper using polyethyleneimine, black spot fogs occurred on the emulsion layer, by which it was understood that the polyethyleneimine had a bad influence upon the photographic emulsion.

EXAMPLE 4

With using paper for photography having 180 g/m$^2$ of the weight in which a solution of the primer having the following Composition VI was applied to both surfaces and, as a comparison example, paper for photography both surfaces of which were subjected to corona discharging at 50 kw/1 cm width and 10 m/minute of the processing rate, bases for printing paper were produced by applying polyethylene having a density of 0.945 g/cc to both surfaces of each of them at 280° C. of the extrusion temperature so as to have 40 μm of the thickness. Further, in order to compare, a base for printing paper was produced by the same manner without carrying out the primer processing.

| Composition VI | |
|---|---|
| Emulsion of ionomer having 50% of the solid content (ethylene: 90 mol%, acrylic acid: 4 mol%, methyl methacrylate: 6 mol%, degree of neutralization: 83%, metal: Ca$^{++}$) | 10 g |
| Water | 50 ml |
| Ethanol | 40 ml |

The amount of the primer on one surface was 0.3 g/m$^2$. When the printing papers having the above-described bases were developed, polyethylene was not separated from the paper in case of carrying out the primer processing, while separation of the polyethylene layer at the edges of the printing paper occurred in the development processing solution in case of carrying out only corona discharging without the primer processing, by which it was proved that the primer processing was effective.

EXAMPLE 5

On a surface of a photographic paper having 160 g/m$^2$ of the weight, resinous solid ionomer having the following Composition VII and polyethylene (density: 0.940 g/cc, molecular weight: 1,000,000) were applied by simultaneous extrusion coating in order.

Composition VIII

Ionomer (ethylene: 95%, acrylic acid: 5%, degree of neutralization: 78%, metal: $Zn^{++}$)

The thickness of the ionomer was 8 μm and the extrusion temperature thereof was 280° C. The thickness of the polyethylene was 28 μm and the extrusion temperature thereof was 300° C. Further, as comparison examples, lamination was carried out by extruding only the polyethylene. In these cases, the thickness was 28 μm or 36 μm, and the extrusion temperature was 300° C.

The adhesive strength between paper and polyethylene in the resulting waterproof printing paper was as follows. In case of carrying out simultaneous extrusion coating, separation between paper and ionomer and between ionomer and polyethylene were not observed at all. On the contrary, in case of carrying out extrusion coating of only polyethylene so as to have 28 μm of the thickness, the adhesive strength was 62 g/25 mm width. In case of carrying out extrusion coating of only the polyethylene so as to have 36 μm of the thickness, the adhesive strength was 110 g/25 mm width. Accordingly, it was proved that the effect of the primer was remarkably exhibited by carrying out the simultaneous extrusion coating of the ionomer and the polyethylene.

While the invention has been described in detail and with reference to specific embodiments thereof, it will be apparent to one skilled in the art that various changes and modifications can be made therein without departing from the spirit and scope thereof.

What is claimed is:

1. In a base for a photographic light-sensitive material comprising a polyolefin coated paper, the improvement which comprises a layer of an ionomer of
   (a) an α-olefin represented by the formula $RCH=CH_2$, where R represents a hydrogen atom or a hydrocarbon group having 1 to 8 carbon atoms, and
   (b) an α,β-ethylenically unsaturated carboxylic acid in which the degree of neutralization of the carboxyl groups in said acid by metal ions ranges from 20 to 90%, said acid being present in the ionomer in an amount of about 0.2 to 40 mol%, between the surface of the paper and the polyolefin coating.

2. The base of claim 1, wherein said α-olefin is ethylene.

3. The base of claim 1, wherein said α,β-ethylenically unsaturated carboxylic acid has 3 to 10 carbon atoms and 1 or 2 carboxyl groups.

4. The base of claim 3, wherein said α,β-ethylenically unsaturated carboxylic acid is selected from the group consisting of acrylic acid, methacrylic acid, α-ethylacrylic acid and itaconic acid.

5. The base of claim 1, wherein said ionomer is crosslinked by ionic linkages formed with metal ions having valencies of 1 to 3 from Groups I, II, III, IV-A and VIII of the Periodic Table.

6. The base of claim 5, wherein said metal is selected from the group consisting of $Na^+$, $K^+$, $Ca^{++}$, $Mg^{++}$, $Zn^{++}$, $Ba^{++}$, $Fe^{++}$, $Co^{++}$, $Ni^{++}$, $Fe^{+++}$ and $Al^{+++}$.

7. The base of claim 6, wherein said metal is selected from the group consisting of $Na^+$, $K^+$, $Mg^{++}$, $Ca^{++}$ and $Zn^{++}$.

8. The base of claim 1, wherein said copolymer is an ethylene-acrylic acid copolymer, an ethylene-methacrylic acid copolymer or an ethylene-itaconic acid copolymer.

9. The base of claim 1, wherein said ionomer has a melt index of about 0.1 to 100 g/10 min.

10. The base of claim 1, wherein said polyolefin is polyethylene or polypropylene.

11. In a photographic paper comprising a paper support having coated thereon a layer of a polyolefin and one or more light-sensitive photographic emulsion layers, the improvement which comprises a layer of an ionomer of
   (a) an α-olefin represented by the formula $RCH=CH_2$, wherein R represents a hydrogen atom or a hydrocarbon group having 1 to 8 carbon atoms, and
   (b) an α,β-ethylenically unsaturated carboxylic acid in which the degree of neutralization of the carboxyl groups in said acid by metal ions ranges from 20 to 90%, said acid being present in the ionomer in an amount of about 0.2 to 40 mol%, between the surface of the paper and the polyolefin coating.

* * * * *